(12) United States Patent
Haverinen et al.

(10) Patent No.: US 7,251,733 B2
(45) Date of Patent: Jul. 31, 2007

(54) METHOD, SYSTEM AND DEVICES FOR TRANSFERRING ACCOUNTING INFORMATION

(75) Inventors: Henry Haverinen, Jyuäskylä (FI); Pekka Laitinen, Helsinki (FI); Nadarajah Asokan, Espoo (FI)

(73) Assignee: Nokia Corporation, Espoo (FI)

( * ) Notice: Subject to any disclaimer, the term of this patent is extended or adjusted under 35 U.S.C. 154(b) by 733 days.

(21) Appl. No.: 10/601,337

(22) Filed: Jun. 20, 2003

(65) Prior Publication Data

US 2004/0064741 A1    Apr. 1, 2004

(30) Foreign Application Priority Data

Jun. 20, 2002    (WO) ................ PCT/IB02/02289

(51) Int. Cl.
    *G06F 1/24*    (2006.01)
(52) U.S. Cl. ..................... 713/182; 713/179
(58) Field of Classification Search ............. 713/182, 713/189, 193
    See application file for complete search history.

(56) References Cited

U.S. PATENT DOCUMENTS

| 5,240,334 | A | * | 8/1993 | Epstein et al. ............. 400/88 |
| 5,319,532 | A | * | 6/1994 | Pidancet ................... 362/646 |
| 5,369,258 | A | * | 11/1994 | Sansone et al. ............ 235/381 |
| 6,219,790 | B1 | | 4/2001 | Lloyd et al. |

FOREIGN PATENT DOCUMENTS

| EP | 1 191 763 | 3/2002 |
| WO | WO 01/24476 | 4/2001 |
| WO | WO 01/67716 | 9/2001 |
| WO | WO 02/11468 | 2/2002 |
| WO | WO 02/35797 | 5/2002 |

OTHER PUBLICATIONS

K. Sklower et al, "The PPP Multilink Protocol (MP)," RFC 1990, Aug. 1996, 37pp.
D. Eastlake et al., "XML-Signature Syntax and Processing," RFC 3275, Mar. 2002, 73pp.
J. Ala-Laurila et al., "Wireless LAN Access Network Architecture for Mobile Operators," IEEE Communications Magazine, Nov. 2001, pp. 82-89.
RSA Security Inc., "Public-Key Cryptography Standards (PKCS) #1 v2.1," RSA Laboratories, 2002, 61pp.
RSA Security Inc., "PKCS #7: Cryptographic Message Syntax Standard, v1.5," rev. Nov. 1, 1993, RSA Laboratories, 30pp.

* cited by examiner

*Primary Examiner*—Thomas R. Peeso
(74) *Attorney, Agent, or Firm*—Alfred A. Fressola; Ware, ressola, Van Der Sluys & Adolphson LLP

(57) ABSTRACT

A method in a system for transferring accounting information, a system for transferring accounting information, a method in a terminal, a terminal, a method in an Extensible Authentication Protocol (EAP) service authorization server, an EAP service authorization server, a computer program, an Extensible Authentication Protocol response (EAP-response) packet, wherein the method:

meters data related to a service used by at least one terminal, provides the metered data as accounting information to at least one Extensible Authentication Protocol (EAP) service authorization server, sends, by means of an Extensible Authentication Protocol request (EAP-request), a service authorization request from the at least one EAP service authorization server to the at least one terminal, digitally signs accounting information, in the at least one terminal, includes, at the at least one terminal, the digitally signed accounting information in an Extensible Authentication Protocol response (EAP-response), and sends the digitally signed accounting information to an AAA-server.

51 Claims, 7 Drawing Sheets

FIG 8

| 0 1 2 3 4 5 6 7 8 9 | 1 0 1 2 3 4 5 6 7 8 9 | 2 0 1 2 3 4 5 6 7 8 9 | 3 0 1 |
|---|---|---|---|
| 802 CODE | 804 IDENTIFIER | 806 LENGTH | |
| 808 TYPE | 810 DATA TYPE | 812 DATA... | |

FIG 9

| 0 1 2 3 4 5 6 7 8 9 | 1 0 1 2 3 4 5 6 7 8 9 | 2 0 1 2 3 4 5 6 7 8 9 | 3 0 1 |
|---|---|---|---|
| 802 CODE | 804 IDENTIFIER | 806 LENGTH | |
| 808 TYPE | 902 FLAGS | SERV. AUTH. MESSAGE LENGTH | |
| SERV. AUTH. MESSAGE LENGTH | 906 SERV. AUTH. XXX MESSAGE | | |

| 0 1 2 3 4 5 6 7 |
|---|
| L M R R R R R |

METHOD, SYSTEM AND DEVICES FOR TRANSFERRING ACCOUNTING INFORMATION

CROSS REFERENCE TO RELATED APPLICATIONS

This application claims priority under 35 USC §119 to International Patent Application PCT/IB02/02289 filed on Jun. 20, 2002.

TECHNICAL FIELD OF THE INVENTION

The invention relates to a method in a system and a system for transfer of accounting information. Further, the invention relates to a method in a terminal, a terminal, an Extensible Authentication Protocol (EAP) service authorization server, a method in an EAP service authorization server, a computer program, and an EAP sub type.

BACKGROUND OF THE INVENTION

In Local Area Networks an operator of a service may be interested in providing themselves with a variety of accounting information related to the users utilizing the network for accessing different services. Examples of such accounting information may be a value indicating for how long a user has utilized a specific service, a value indicating the amount of data received from and/or sent to a specific service, information regarding when the user utilized the service, and/or the number of and/or the type of transactions performed.

Today there are systems in which the access points of the network collect accounting information for each user/terminal connecting to the network via the access point. The access points then send the information to an Authentication Authorization Accounting (AAA) server by means of an AAA protocol like RADIUS or DIAMETER.

However, there may be lack of trust between a service provider, who manages a service utilized by a user, and an operator of a home network, who bill the user for utilized services. Thus, accounting information from the service provider has to be verified and authorized before it is sent to the AAA-server of the operator of the home network.

SUMMARY OF THE INVENTION

It is an object of the present invention to provide improved delivery of accounting information.

More particularly, according to one aspect, a method in a system for transferring accounting information comprises:

metering data related to a service used by at least one terminal, providing the metered data as accounting information to at least one Extensible Authentication Protocol (EAP) service authorization server, sending, by means of an Extensible Authentication Protocol request (EAP-request), a service authorization request from said at least one EAP service authorization server to said at least one terminal, digitally signing accounting information, in said at least one terminal, including, at said at least one terminal, the digitally signed accounting information in an Extensible Authentication Protocol response (EAP-response), and sending the digitally signed accounting information to an AAA-server.

According to another aspect, a system for transferring accounting information comprises:

a metering server for metering data related to a service, an Extensible Authentication Protocol (EAP) service authorization server including a generator for generating Extensible Authentication Protocol request (EAP-request) service authorizations, and a network connection means, a terminal including a signer arranged to digitally sign verified accounting information, an Extensible Authentication Protocol response (EAP-response) generator arranged to insert verified and digitally signed accounting information in EAP-responses, and a network connection means, and an Authentication Authorization Accounting server arranged to manage accounting information relating to at least one terminal.

According to yet another aspect, a method in a terminal comprises:

collecting data corresponding to accounting information relevant for at least one service presently utilized in the terminal, receiving an Extensible Authentication Protocol request (EAP-request) including accounting information relevant for said at least one service presently utilized in the terminal, comparing said received accounting information with the collected data, and, if the collected data corresponds with the accounting information said method further comprising:

digitally signing said received accounting information, and sending the digitally signed accounting information in an Extensible Authentication Protocol response (EAP-response).

According to a further aspect, a terminal comprises:

a collector arranged to collect data corresponding to accounting information relevant for at least one service presently utilized in the WLAN terminal, a comparing device arranged to compare the collected data with received accounting information, a signer arranged to digitally sign verified accounting information, an Extensible Authentication Protocol response (EAP-response) generator arranged to insert digitally signed accounting information in EAP-responses, and a network connection means.

According to yet another aspect, a method in an Extensible Authentication Protocol (EAP) service authorization server, said method comprises:

receiving accounting information related to at least one terminal, inserting said accounting information in an Extensible Authentication Protocol request (EAP-request), and sending said EAP-request to the at least one terminal.

According to yet another aspect, an Extensible Authentication Protocol (EAP) service authorization server comprises:

an accounting information receiver for receiving accounting information relating to at least one terminal, an Extensible Authentication Protocol request (EAP-request) generator arranged to insert accounting information of at least one terminal in an EAP-request, and a network connection means.

By making the terminal/user authorize the accounting information by using EAP to initiate said authorization and to transport signed accounting information from said terminal/user it may be possible to provide authorization of accounting information by the user or the terminal of the user without requiring much extra effort from an access network operator, a service operator, or the user in regard of modifying existing systems. In many cases it may be an advantage that EAP already exists, thus, no need to implement or develop additional protocols. Further the EAP service authorization server establishes contact with the terminal during the establishment of a connection to the access network, thus, there is no need to use server discovery protocols, client IP address discoveries, or other similar procedures. Also, the EAP message including the service authorization is able to traverse personal firewalls and Virtual Private Network (VPN) clients in the terminal.

By making it possible for the user/terminal to authorize the accounting information, the correctness of the accounting information may be guaranteed, and the uncertainty of account information sent directly from an operator of the access network, which operator may or may not be trustworthy, is eliminated. Thus, an operator of the access network, or any other service, is not able to forge the accounting information and thereby the user may not later on repudiate the accounting information. Further, this may also make a user feel more comfortable in using services that costs money, because the user is to some extent in control of the debiting procedure and not totally in the hands of the operators.

In the context of the invention, service is a service that is possible to access by means of a terminal via a service provider. For example a service may include access to one or a plurality of network environments, e.g. a local network, a private network, the Internet, a specific operator controlled network, or a virtual local area network, and it may include access to different facilities, e.g. facilities for e-mail, facilities for Short Message Service (SMS), facilities for Multi Media Service (MMS), facilities for e-commerce, printing facilities, etc.

According to one embodiment the metering server and the EAP service authorization server is comprised in the same device, e.g. an access point. This may increase the available bandwidth in a access network because information exchange between the metering server and the EAP service authorization server no longer needs to utilize the network, e.g. the amount of protocol messages sent may decrease.

According to another embodiment the metering server and the EAP service authorization server is comprised in different devices. This feature may facilitate introduction of an EAP service authorization server in a network system that already includes a metering server. For example in a Wireless LAN including access points that supports Radius accounting or any other accounting protocol.

In one embodiment the EAP-request and the EAP-response is sent over a WLAN connection.

In another embodiment the EAP-response including the signed account information from the terminal is sent to, or received by, the EAP service authorization server. This makes it possible for the operator of the access network to check that the user of the terminal or the terminal has not tampered with the accounting information. Additionally, the operator of the access network may control the identity of the user of the terminal if necessary.

In yet another embodiment the signing and the verification of a signature is performed by means of a public key crypto system.

A further scope of applicability of the present invention will become apparent from the detailed description given below. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other features and advantages of the present invention will become apparent from the following detailed description of a presently preferred embodiment, with reference to the accompanying drawings, in which FIG. 8 shows a schematic view of the format of an embodiment of an EAP-Request/Service-Authorization packet and an EAP-Response/Service-Authorization packet, FIG. 9 shows a schematic view of the format of another embodiment of an EAP-Request/Service-Authorization packet and an EAP-Response/Service-Authorization packet, and FIG. 10 shows a schematic view of a Flags field of a packet according to FIG. 9.

DETAILED DESCRIPTION OF AN EMBODIMENT

Figure 1:
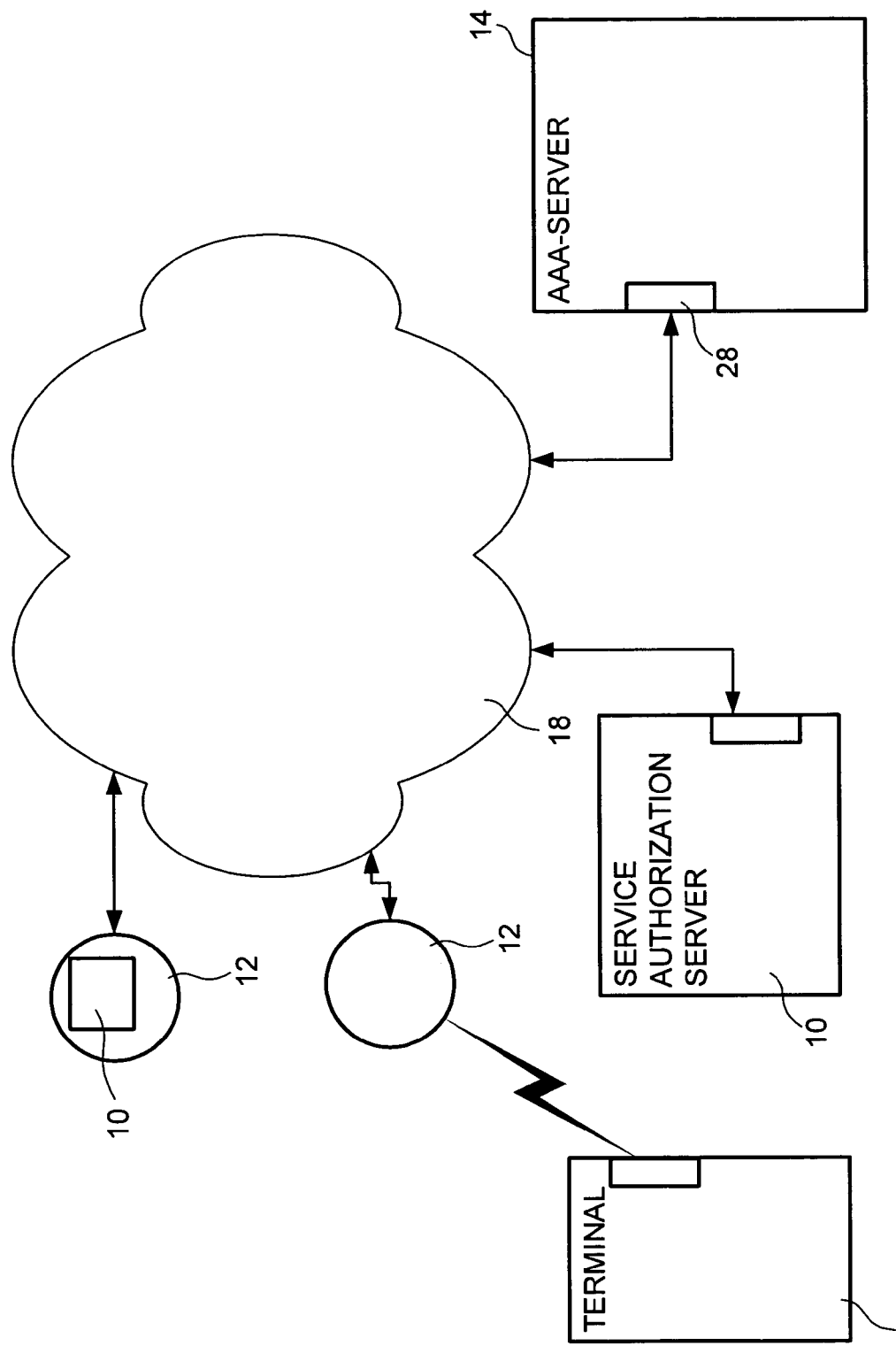
FIG. 1 shows a schematic overview of a system according to one embodiment.

In FIG. 1 a schematic overview of a system according to one embodiment is shown. The system comprises an Extensible Authentication Protocol (EAP) Service authorization server 10, an access point 12, an Authentication Authorization Accounting (AAA) server 14, and a terminal 16.

In one embodiment the communication between an access point 12, an EAP Service authorization server 10, and an AAA-server 14 is performed via a network 18.

The EAP Service authorization server 10 is arranged to provide the terminal 16 with accounting information that the terminal may verify. The EAP Service authorization server 10 may, for example, be arranged as a separate server, included in the access point 12, included in the AAA-server 14, or included in any other device that is able to communicate with the terminal 16, the AAA-server 14 and the access point 12.

The AAA-server 14 may be any type of AAA-server that is known to a person skilled in the art.

The access point 12 may be any type of access point that is known to a person skilled in the art. The access point 12 includes means for metering account information related to one or a plurality of terminals connecting via it. Thus, one may say that it includes a metering server. The access point 12 is arranged to send and receive data by means of wireless communication, e.g. Wireless Local Area Network communication, infrared communication, Bluetooth, or any radio based communication. In one embodiment the access point 12 is an access point that operates in accordance with the IEEE 802 standard and that utilizes an Extensible Authentication Protocol (EAP) according to IEEE 802.1x.

The terminal may be any device having an user interface and means for performing communication. For example the terminal may be a telephone, a Personal Digital Assistant (PDA), a handheld computer, a laptop computer, a desktop computer. The terminal may be arranged to communicate via a wireless communication channel, as shown in FIG. 1, or via a wire, not shown in FIG. 1. The wireless communication may, for example, be Wireless Local Area Network communication, infrared communication, Bluetooth, or any radio based communication. The communication via a wire may, for example, be communication via a modem and a telephone network, a direct connection to a Local Area Network. In a system where there are terminals connected to the network via wires there may be arranged a separate metering server for collecting the accounting information.

In one embodiment the access point 12 is part of an access network that is managed by an access network operator and the AAA-server is part of an accounting management system managed by an AAA-server operator or an home operator. The access network operator and the home operator may be part of the same organization or different organizations.

The service authorization may relate to a network access, but, it may also relate to a printer service in which a user, for example, pays per printed page, an e-commerce service in which a user, for example pays for the ordered service or product, etc.

Figure 2:
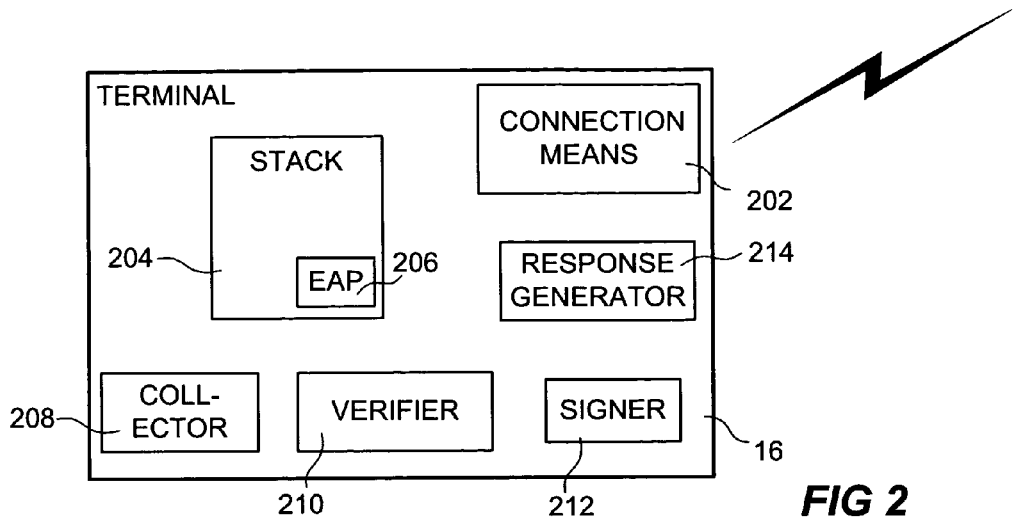
FIG. 2 shows a schematic view of one embodiment of a terminal.

In FIG. 2 one embodiment of a terminal 16 is shown. The terminal 16 comprises a connection means 202 for wireless connection to and communicating via an access point, and a protocol stack 204 comprising an EAP 206. However, as mentioned above the connection means may be a modem or an ordinary network interfacing card for connecting to said network by means of a wire. Further, the terminal 16 comprises a collector 208 for collecting data corresponding to accounting information relevant for at least one service presently utilized in the terminal, a verifier 210 for verifying that the accounting information received from the corresponds to the collected data, a signer 212 for signing accounting information that has been approved by the comparing means, and an EAP-response generator 214 for inserting signed accounting information into an EAP-response message.

In one embodiment the collector collects an input from a user stating whether the user accepts the accounting information or not. Then, in such an embodiment, the verifier only has to check the collected input from the user in order to decide whether the verification is a success or not.

The signer 212 may comprise means for performing any type of digital signing known to a person skilled in the art, e.g. it may be a public key cryptosystem, which normally is used for signing, or it may be a symmetric encryption system. In a public key crypto system there is one private and one public key. The public key may be distributed to all involved parties. The signer then encrypts a message by means of the private key. If said message then is possible to decrypt using the public key the signature is verified as being the signature of the person having the public key.

The means 202–214 described above may be entirely or partially implemented by means of software code.

The accounting information may be a value indicating for how long time the terminal has been connected to a service, a value indicating the amount of data sent and/or received using a specific service, information regarding when the user utilized the service, the number of and/or the type of transactions performed, and/or the number of service utilizations.

Figure 3:
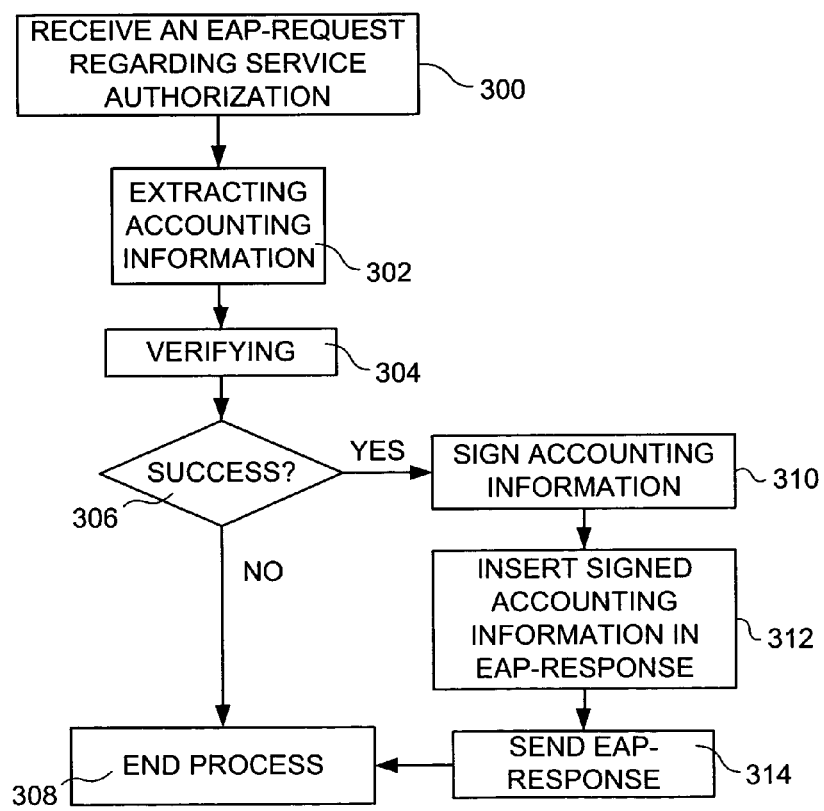
FIG. 3 shows a flowchart of a process for handling accounting information in the terminal of FIG. 2.

In FIG. 3 a process in one embodiment of the terminal is shown. The process starts when the terminal receives an EAP-request for service authorization including accounting information, step 300. Then the accounting information is extracted from the EAP-request, step 302. When the accounting information is available in the terminal a process of verifying starts, step 304.

The step of verifying may be performed in many ways. In one embodiment the terminal collects data corresponding to the accounting information for a service presently in use during essentially the entire period when the service is used. Then, when the verifying step 304 is performed the terminal compares the collected data with the received accounting information and makes a decision based on the difference between the collected data and the received accounting information regarding whether the verification of the accounting information is successful or not.

In another embodiment the received accounting information the terminal does not perform the comparison, but presents the accounting information and the collected data for the user who decides whether to verify the accounting information or not. If the user verifies then the step of verifying 304 is a success, else it is a failure.

In yet another embodiment the terminal does not collect said data and, thus, no collected data is available. In such case the step of verifying 304 may present the received accounting information for the user and wait for him to verify the accounting information. If the user verifies then the step of verifying 304 is a success, else it is a failure.

In a further embodiment the terminal collects data and compares the data with the received accounting information. However, the terminal provides an interface for the user by means of which the user may select "ok" or "cancel" in order to accept the accounting information or prevent it from being sent. The signing of the accounting information may be performed before or after the user has notified the terminal of the selection.

In another embodiment the EAP-request for service authorization, received in step 300, does not include any accounting information. In such case the step 302 regarding extracting accounting information is not performed. After receipt of the EAP-request for service authorization, the terminal regards data collected by itself as verified accounting information and, thus, the step of verification regarded as a success.

In step 306, independent of which of the above embodiments of the verifying step 304 that is used, the process checks whether the verifying step 304 resulted in a success or a failure. If the result is a failure then the process is ended, step 308. However, if the result is a success then the process proceeds by signing the accounting information, step 310.

The signing, step 310, may be performed by means of any method known by a person skilled in the art. For example, by means of public key encryption. Also other signing schemes may be used, e.g. a symmetric cryptography system may be used to encrypt the accounting information, however, in such a case only the terminal and the home operator may share the key of representing the signature.

Then the signed accounting information is inserted in an EAP-response, step 314, and the EAP-response is sent via the network connection.

Figure 4:
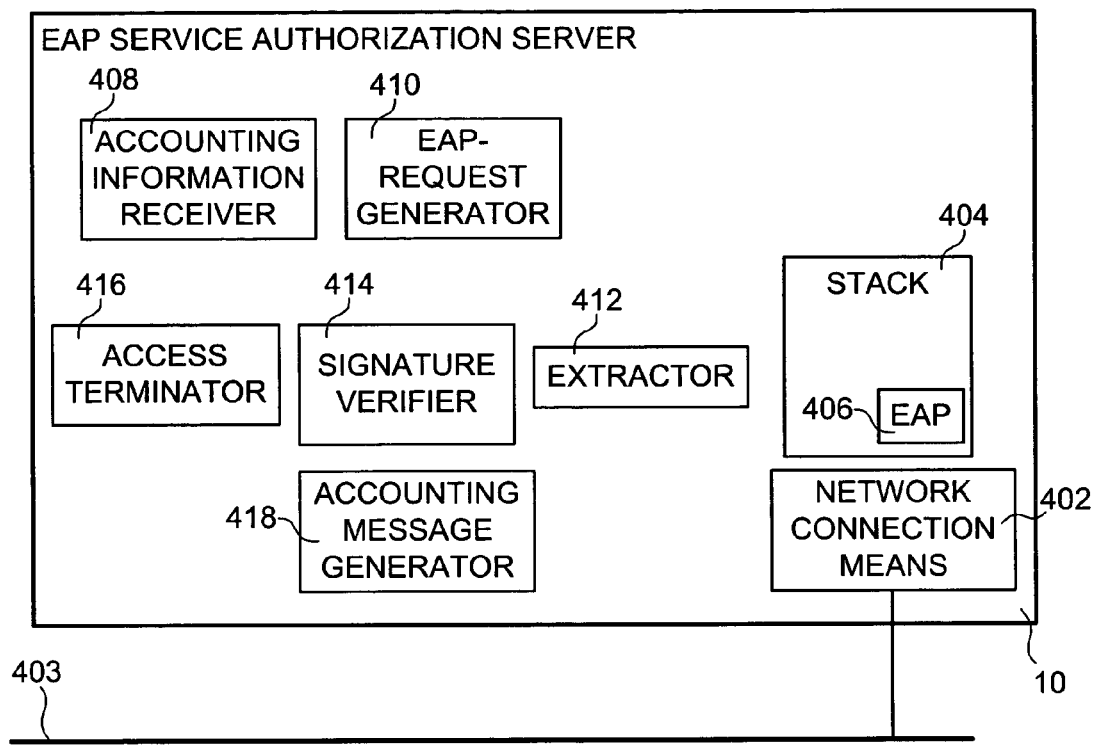
FIG. 4 shows a schematic view of one embodiment of a EAP service authorization server.

In FIG. 4 one embodiment of the EAP service authorization server is shown 10. The EAP service authorization server according to the figure comprises network connection means 402 for connecting to a network 403, and a protocol stack 404 including a EAP 406. If the EAP service authorization server 10 is not a device in which only the EAP service authorization server 10 is implemented, the network connection means 402 and the protocol stack 404 may be shared by the other devices, e.g. if the EAP service authorization server 10 is included in a access point, in an AAA server, or in a AAA proxy server. In one embodiment the stack also includes an AAA protocol, e.g. RADIUS protocol or a DIAMETER protocol.

Further, the EAP service authorization server 10 includes an accounting information receiver 408, which is arranged to manage accounting information received from one or a plurality of access points, and an EAP-request generator, which is arranged to utilize EAP 406 and generate EAP-requests for service authorizations. According to one embodiment the EAP-request includes accounting information of a specific terminal for sending to said specific terminal, this is implemented if the terminal or user is to make the decision regarding whether the accounting information from the EAP service authorization server is correct or not. According to another embodiment, the EAP-request for service authorization does not include any accounting information, this is implemented if the EAP service authorization server is to make the decision regarding whether the accounting information from the terminal is correct or not.

The time between sending two consecutive EAP-requests including accounting information of a specific terminal may be based on the time between reception of accounting information, a value of a specific property of the accounting information, e.g. said EAP-request is to be sent when the time passed since the last request exceeds a specific value or when the amount of data sent and/or received since the last request exceeds a specific value, or a predetermined criteria set by one of the operators. The EAP service authorization may be arranged to handle accounting information relating to one or a plurality of terminals.

Further, the EAP service authorization server 10 includes an extractor 412, a signature verifier 414, an access terminator 416, and an accounting message generator 418.

The extractor 412 is arranged to extract signed accounting information from an EAP-response originating from an terminal.

The verifier 414 is arranged to verify the signature and the content of the EAP-response message. Verification of the content may be achieved by checking if the received accounting information corresponds to information sent from the EAP service authorization server to the terminal or if the received information corresponds to information collected at the EAP service authorization server. Verification of the signature may be achieved by means of a public key stored in the EAP service authorization server 10. The public key may have been provided to the EAP service authorization server 10 from the terminal in the form of a certificate in an EAP-response, or from the AAA server in a Diameter/Radius EAP-Answer message during the access authorization process.

The access terminator 416 is arranged to terminate the access to a specific service if one or a plurality of predetermined criteria are not met.

The accounting message generator is arranged to generate an AAA-message including signed accounting information and initiate sending of the message to an AAA-server managing the service that the accounting information is related to.

Figure 5:
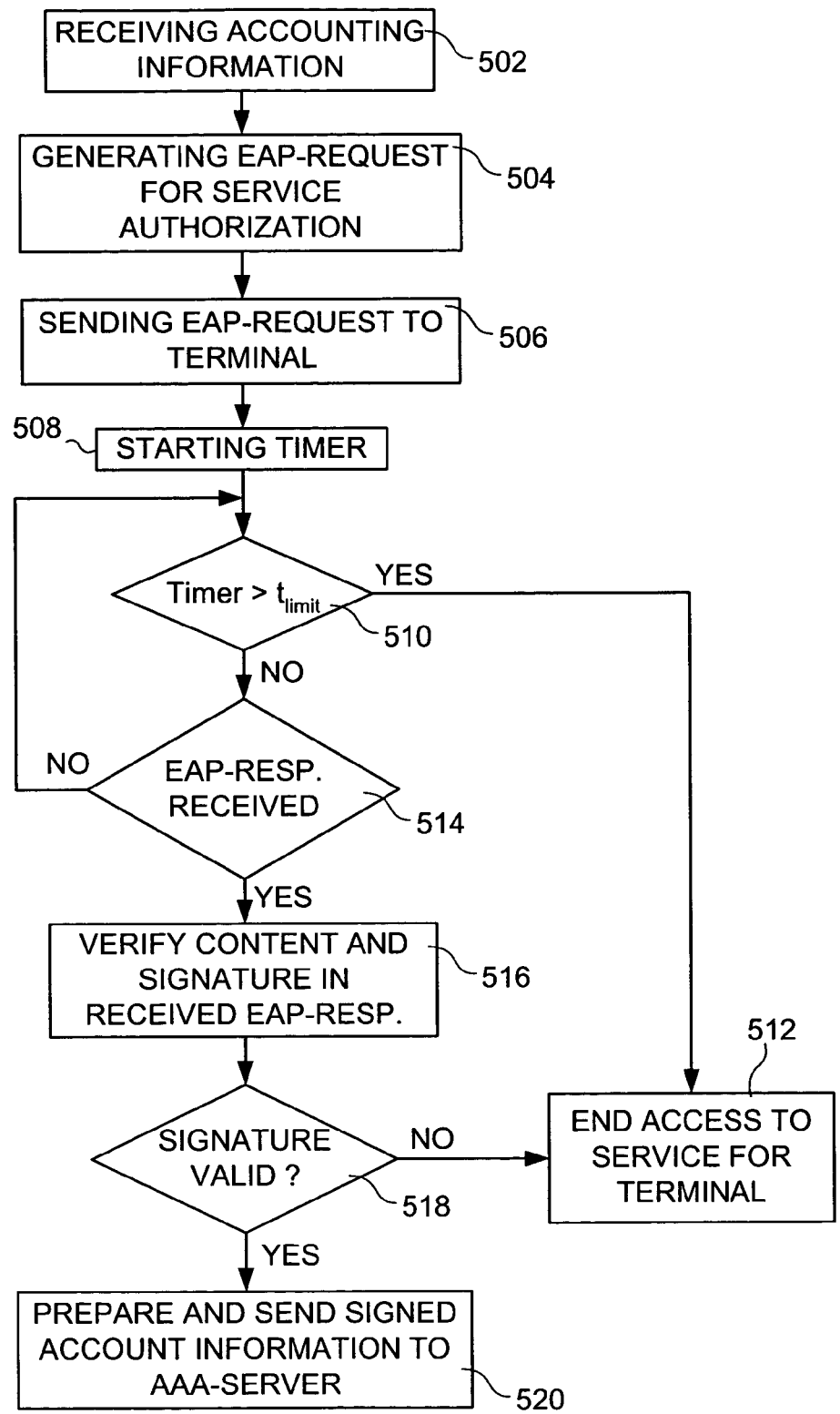
FIG. 5 shows a flowchart of a process for handling accounting information and, FIG. 6 shows a timing diagram over messages sent during a transmission of account information according to one embodiment.

In FIG. 5 a process of one embodiment of the EAP service authorization server 10 is shown. The process starts when the EAP service authorization server 10 receives accounting information related to a specific terminal, step 502. Then, an EAP-request is generated, the EAP-request includes said accounting information, step 504. Then the EAP-request is sent to said terminal, which the accounting information relates to, step 506. In one embodiment the generation and sending of the EAP-request including the accounting information is not performed until the accumulated value of a specific property in the accounting information has been reached, e.g. a time value, a value of sent and/or received data, or a value relating directly to money, i.e. the sending may be performed periodically or once in a certain period of time.

When the EAP-request is sent, a timer is started, step 508. In step 510 the value of the timer is compared with a predetermined time limit, $t_{limit}$. If the value of the timer does not exceed $t_{limit}$ then the process continues by checking whether an EAP-response has been received from the terminal, step 514. If no EAP-response has been received, the process returns to step 510 so as to compare the value of the timer with the value of $t_{limit}$. If the value of the timer exceed the value of $t_{limit}$, then no EAP-response has been received within the time limit and the process continues to step 512 and ends the access to the service that the accounting information relates to. However, if an EAP-response is received, step 514, before the time limit runs out, the EAP service authorization server 10 verifies the signature in the EAP-response, step 516, by means of the signature of the terminal or the user of the terminal that is stored in a memory of the EAP service authorization server 10. The process may also verify that the received accounting information corresponds to the accounting information sent to the terminal. If the signature is not valid, step 518, the process continues to step 512 and ends the access to the service that the accounting information relates to. However if the signature is valid the process continues to step 520, where it prepares and sends the signed account information to an AAA-server.

According to another embodiment, the EAP-request generated in step 504 does not include the accounting information and, thus, the accounting information received in the EAP-response, step 514, is information collected by the terminal. Thus, the verification of content in step 516 is performed by comparing the received accounting information with corresponding accounting information collected at the EAP service authorization server.

Figure 6:
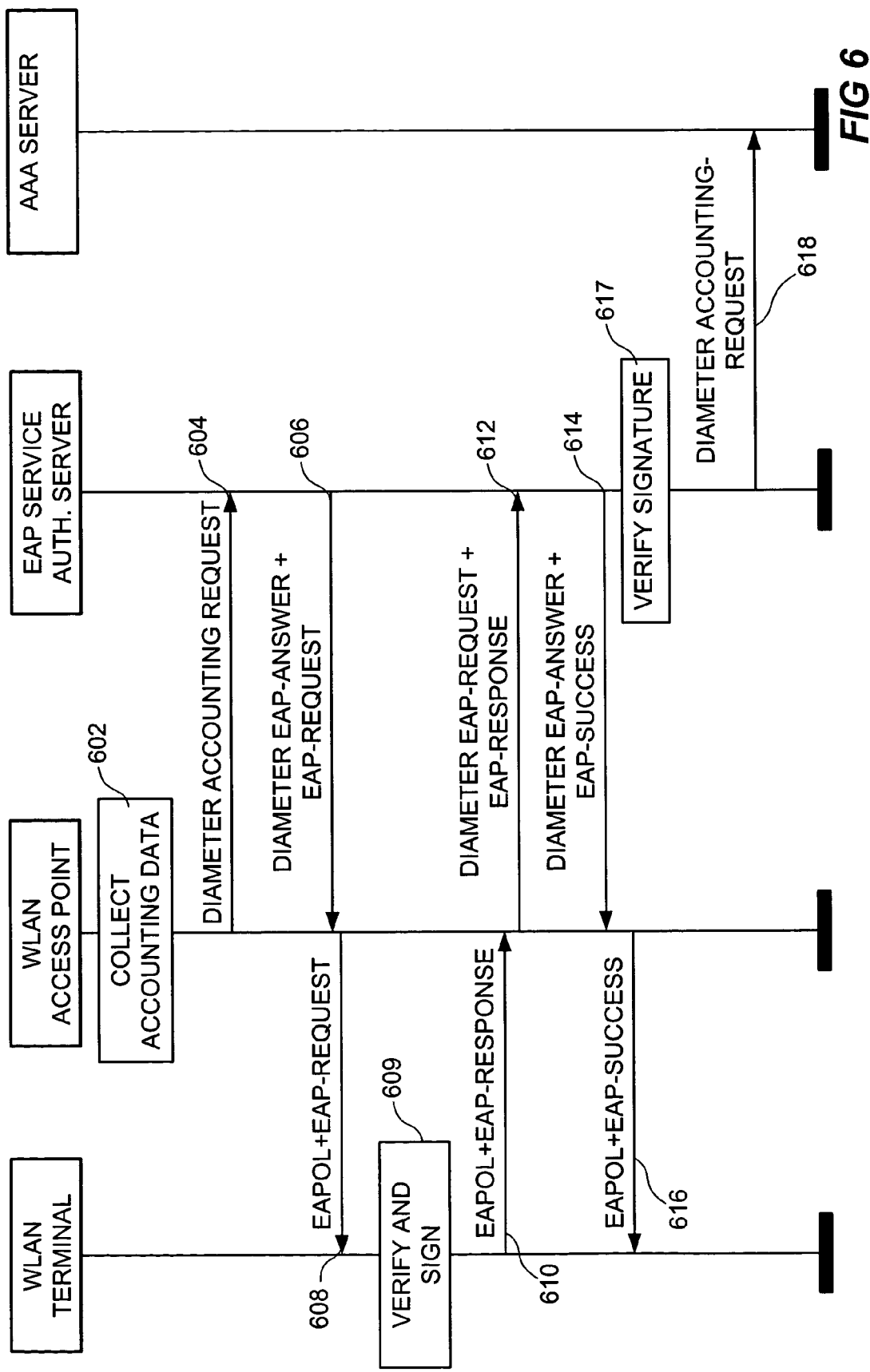

In FIG. 6 there is shown a timing diagram according to one embodiment in which the EAP service authorization server is arranged as a separate device, in a AAA-proxy, or in another suitable device. According to this embodiment an access point collects accounting information for one or a plurality of users/terminals. For each user/terminal the access point collects data at least during the time period the terminal is accessing a service, 602. When accounting information has been collected during a predetermined period of time or for a predetermined amount of sent and/or received data, the access point sends a Diameter accounting request, 604, including the accounting information related to a specific terminal to an EAP service authorization server. The accounting request is not necessarily sent by means of the Diameter protocol, but may be sent by means of any protocol that may be used to achieve a corresponding functionality, e.g. the RADIUS protocol. This also applies for other transmissions mentioned below as using the Diameter protocol.

The EAP service authorization server then manages the Diameter accounting request, message 604, see FIGS. 4 and 5, and the included accounting information responds by sending a Diameter EAP-answer, message 606, to the access point. The Diameter EAP-answer includes an EAP-request/ Service-Authorization that carries accounting information. The EAP-request/Service-Authorization message carrying the accounting information is then packed by the EAP over LAN (EAPOL) protocol at the access point and is sent as any other EAP-request to said specific terminal, message 608. In the depicted embodiment the terminal is a Wireless Local Area Network (WLAN) enabled terminal. However, as mentioned above, the terminal may be arranged for communication by means of other methods. The terminal then manages the received EAP-Request, checks the accounting information 609, also see FIGS. 2 and 3, and sends an EAPOL including an EAP-Response/Service-Authorization that carries signed accounting information to the access point, message 610. The sending of the EAPOL including the EAP-Response/Service-Authorization that carries signed accounting information is only performed if the verification of the accounting information was successful. The access point then passes the EAP-Response/Service-Authorization, carrying the signed accounting information, to the EAP service authorization server by means of a Diameter EAP-Request, message 612. Then the EAP service authorization server generates an EAP-success message and sends it in an Diameter EAP-answer to the access point, message 614. The access point then passes the EAP-success message on to the terminal by means of an EAPOL, message 616. When the signed accounting information is received at the EAP service authorization server in message 612, the EAP service authorization server starts to verify the signature of the accounting information 617, also see FIGS. 4 and 5. If the verification of the signature is successful, i.e. the signature is valid, then the EAP service authorization server sends a Diameter Accounting-Request including the signed accounting information to an AAA server that is to manage the accounting information.

Figure 7:
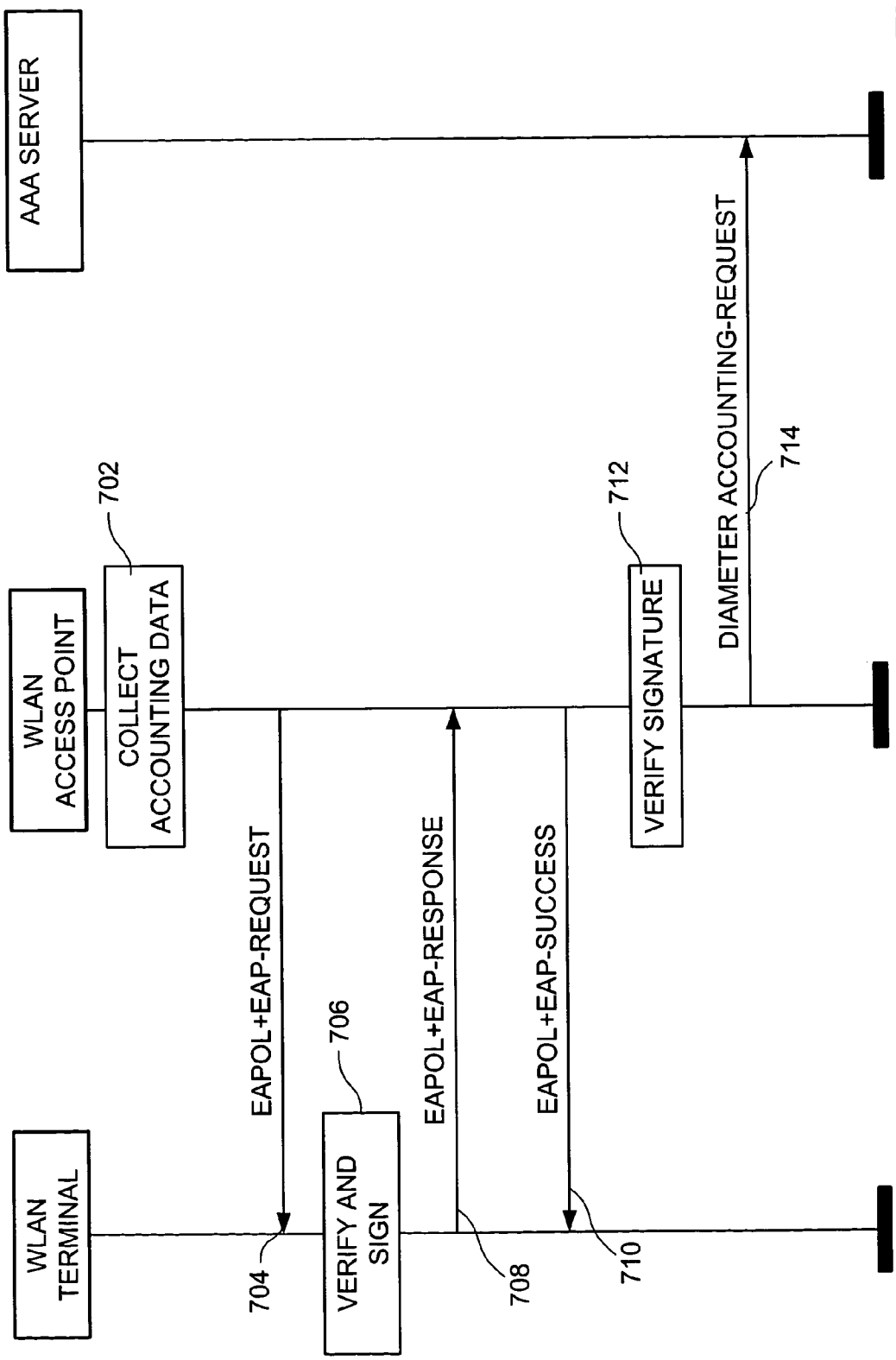
FIG. 7 shows a timing diagram over messages sent during a transmission of accounting information according to another embodiment.

In FIG. 7 there is shown a timing diagram according to another embodiment in which the EAP service authorization server is included in the access point. In this embodiment the account information collected or measured 702 by means of the access point is accessible for the EAP service authorization server or is passed to the EAP service authorization server by means of internal communication within the access point. Then the Access point/EAP service authorization server generates and sends an EAPOL message including an EAP-Request/Service-Authorization carrying the accounting information, message 704, to the terminal. In the depicted embodiment the terminal is a WLAN enabled terminal. However, as mentioned above, the terminal may be arranged for communication by means of other methods. In the terminal the accounting information is verified 706. If the verification is successful then the accounting information is signed and the terminal sends an EAPOL message 708 including an EAP-Response/Service-Authorization, which is carrying the signed accounting information, to the access point. In response to this message the access point responds by sending an EAPOL message including an EAP-Success message 710. Then the access point/EAP service authorization server generates and sends a Diameter Accounting-Request 714 to the AAA server.

In FIG. 8 an embodiment of an EAP sub type in the form of an EAP-packet format specialized for EAP-Request/ Service-Authorization and EAP-Response/Service-Authorization is showed. The EAP-Request/Service-Authorization and EAP-Response/Service-Authorization packet both comprises a Code field 802, an Identifier field 804, a Length field 806, a Type field 808, a Data type field 810, and a Data field 812.

As in the EAP specification the length of the Code field 802 is 8 bits, i.e. one octet, and identifies the type of EAP-packet that are to be sent. EAP-codes are assigned as follows:

| | |
|---|---|
| 1 | Request |
| 2 | Response |

Other codes used in the Code field 802 of EAP-packets are 3 for Success and 4 for Failure. However for these codes the format of the EAP-packet does not necessarily correspond to the format of the EAP-Request/Service-Authorization and EAP-Response/Service-Authorization as shown in FIG. 8. A specific format for EAP-Success and EAP-Failure packets may be found in the specification of EAP contained in IETF RFC 2284.

The Identifier field 804 is also one octet and includes an identification code for matching responses with requests. Generation of such identification codes is known by the skilled person.

The Length field 806 is two octets and indicates the length of the EAP packet including the Code field 802, the Identifier field 804, the Length field 806, the Type field 808, the Data type field 810, and the Data field 812.

The Type field 808 is one octet and specifies the type of the EAP packet. For the EAP-Request/Service-Authorization and EAP-Response/Service-Authorization the Type field 808 is set to a code identifying the packet as a Service-Authorization packet.

The Data type field 810 is one octet and specifies the type of data of the Data field 812. According to one embodiment of the EAP-Request/Service-Authorization the type of data may, for example, be Attribute-Value pairs, Must-Show textual string, or XML document. According to one embodiment of the EAP-Response/Service-Authorization the Data type field identifies the type of the signed data, which may, for example, be a PKCS#1 Signature, PKCS#7 signed data, or an XML-Signature. A description of PKCS#1 is found in "PKCS #1: RSA Cryptography Standard", Version 2.0, October 1998, from RSA Laboratories. A description of PKCS#7 is found in "PKCS #7: Cryptographic Message Syntax Standard", Version 1.5, November 1993, from RSA Laboratories. A description of XML-signature is found in the following document by D. Eastlake 3$^{rd}$, J. Reagle, D. Solo, "(Extensible Markup Language) XML-signature Syntax and Processing", RFC 3275, March 2002.

The Data field 812 may comprise any number of octets. According to one embodiment of the EAP-Request/Service-Authorization the Data field 812 includes said account information, which may, for example, be in the form of Attribute value pairs, a Must-Show textual string, or an XML Document. According to one embodiment of the EAP-Response/Service-Authorization the data field 812 includes said signed account information, which may be signed in accordance with the method specified in the Data type field 810.

The amount of data to be transmitted in a single Service Authorization message may be very large. The service authorization messages sent in a single round may, thus, be larger than the size of a Point-to-Point Protocol Maximum Transmission unit(PPP MTU), a maximum RADIUS packet size of 4096 octets, or even a Multilink Maximum Received Reconstructed Unit (MRRU). As described in IETF RFC 1990, "The PPP Multilink Protocol (MP)", by Sklower, K., Lloyd, B., McGregor, G., Carr, D. and T. Coradetti, Autust 1996, the multilink MRRU is negotiated via the Multilink MRRU LCP option, which includes an MRRU length field of two octets, and thus can support MRRUs as large as 64 KB.

However, in order to protect against reassembly lockup and denial of service attacks, it may be desirable for an implementation to set a maximum size for one such group of Service Authorization messages. Since a typical certificate chain is rarely longer than a few thousand octets, and no other field is likely to be anywhere near as long, a reasonable choice of maximum acceptable message length might be 64 KB.

If this value is chosen, then fragmentation can be handled via the multilink PPP fragmentation mechanisms described in IETF RFC 1990. While this is desirable, there may be cases in which multilink or the MRRU LCP option cannot be negotiated. As a result, an EAP-Service-Authorization implementation may, according to one embodiment, be arranged to provide its own support for fragmentation and reassembly.

Since EAP is a simple ACK-NAK protocol, fragmentation support can be added in a simple manner. In EAP, fragments that are lost or damaged in transit will be retransmitted, and since sequencing information is provided by the Identifier field in EAP, there is no need for a fragment offset field as is provided in IPv4.

EAP-Service-Authorization fragmentation support may be provided through addition of a flags octet within the EAP-Response and EAP-Request packets, as well as a Service Authorization Message Length field of four octets. For example, flags may include the Length included (L) and More fragments (M) bits. In such a case, the L flag may be set to indicate the presence of the four octet Service Authorization Message Length field, and is set for the first fragment of a fragmented Service Authorization message or set of messages. Accordingly, the M flag is set on all but the last fragment. The Service Authorization Message Length field may be four octets, and provides the total length of the Service Authorization message or set of messages that is being fragmented; this may simplify buffer allocation.

When an EAP-Service-Authorization peer receives an EAP-Request packet with the M bit set, it responds with an EAP-Response with EAP-Type=EAP-Service-Authorization and no data. This serves as a fragment Acknowledgement (ACK). The EAP server wait until it receives the EAP-Response before sending another fragment. In order to prevent errors in processing of fragments, the EAP server may increment the Identifier field for each fragment contained within an EAP-Request, and the peer may include this Identifier value in the fragment ACK contained within the EAP-Reponse. Retransmitted fragments may contain the same Identifier value.

Similarly, when the EAP server receives an EAP-Response with the M bit set, it responds with an EAP-Request with EAP-Type=EAP-Service-Authorization and no data. This serves as a fragment ACK. The EAP peer wait until it receives the EAP-Request before sending another fragment. In order to prevent errors in the processing of fragments, the EAP server may use increment the Identifier value for each fragment ACK contained within an EAP-Request, and the peer may include this Identifier value in the subsequent fragment contained within an EAP-Reponse.

According to one embodiment an EAP-Service-Authorization implementation that is arranged to provide its own support for fragmentation and reassembly may utilise an EAP-Request/Service-Authorization packet format and an EAP-Response/Service-Authorization packet format described below and showed in FIG. 9.

Regardless of whether the packet is an EAP-Request/Service-Authorization packet or an EAP-Response/Service-Authorization packet, the packet comprises a Code field 802, an Identifier field 804, a Length field 806, a Type field 808, a Flags field 902, a Service Authorization Message Length field 904. The Code field 802, the Identifier field 804, the Length field 806, and the Type field 808 may be identical to the corresponding fields described in connection with FIG. 8.

The Flags field 902 may be one octet in length and includes flags for controlling the fragmentation. In one embodiment the Flags field may have the format showed in FIG. 10, in which the characters L, M, and R are one bit and are indicating flags, and:
L=Length included
M=More fragments
R=Reserved The L flag (length included) is set to indicate the presence of the four octet Service Authorization Message Length field, and may be set for the first fragment of a fragmented Service Authorization message or set of messages. The M bit (more fragments) is set on all but the last fragment.

The Service Authorization Message Length field 904 may be four octets, and is present only if the L bit is set. This field provides the total length of the Service Authorization or set of messages that is being fragmented.

The Service Authorization XXX Message field 906, is a Service Authorization Request Message field in an EAP-Request/Service-Authorization packet and a Service Authorization Response Message field in an EAP-Response/Service-Authorization packet.

The Service Authorization Request Message field in an EAP-Request/Service-Authorization packet may include data to be signed, i.e. accounting information, and an indication of the format of said data. This may be implemented in a plurality of ways. For example, the Transport Layer Security (TLS) protocol may be utilized. The TSL protocol and the presentation language of TLS is described in IETF RFC 2246, "The TLS Protocol Version 1.0", by T. Dierks, C. Allen, January 1999. Said format may, for example, indicate a text based string, Attribute-Value pairs, or a XML document.

The Service Authorization Response Message field in an EAP-Response/Service-Authorization packet includes the signed data and if necessary an indication of the signing method. The signing methods may, for example, be one of the methods described in connection with FIG. 8.

The invention claimed is:

1. A method in a system for transferring accounting information, said method comprising:
   metering data related to a service used by at least one terminal,
   providing the metered data as accounting information to at least one Extensible Authentication Protocol (EAP) service authorization server,
   sending, by means of an Extensible Authentication Protocol request (EAP-request), a service authorization request from said at least one EAP service authorization server to said at least one terminal,
   digitally signing accounting information, in said at least one terminal, including, at said at least one terminal, the digitally signed accounting information in an Extensible Authentication Protocol response (EAP-response), and sending the digitally signed accounting information to an AAA-server.

2. A method according to claim 1, wherein the act of providing the metered data to the at least one EAP service authorization server is performed by means of internal communication within a device comprising at least one metering server and said at least one EAP service authorization server.

3. A method according to claim 1, wherein the act of providing the metered data to the at least one EAP service authorization server is performed by means of network communication between a device comprising at least one metering server and a device comprising said at least one EAP service authorization server.

4. A method according to claim 1, wherein said metering is performed by at least one metering server included in an access point, and wherein said EAP-request for service authorization and said EAP-response including signed accounting information is received and sent by the terminal via said access point.

5. A method according to claim 4, wherein said receiving and sending by said at least one terminal from/to said access point is performed by means of Wireless Local Area Network (WLAN) communication.

6. A method according to claim 1, wherein said sending of a service authorization request comprises including the accounting information, provided to said at least one EAP service authorization server, in said EAP-request for service authorization, and wherein said method further comprises verifying, performed by said at least one terminal, the accounting information received from said at least one EAP service authorization server before the step of digitally signing accounting information is performed, wherein the accounting information that is signed is the verified accounting information.

7. A method according to claim 1, wherein said sending of a service authorization request comprises including the accounting information, provided to said at least one EAP service authorization server, in said EAP-request for service authorization, and wherein said method further comprises verifying, performed by the user of said at least one terminal, the accounting information received from said at least one EAP service authorization server before the step of digitally signing accounting information is performed, wherein the accounting information that is signed is the verified accounting information.

8. A method according to claim 1, wherein said sending of a service authorization request does not comprise any step of including the accounting information provided to said at least one EAP service authorization server in said EAP-request, and wherein said digitally signing of accounting information comprises digitally signing accounting information collected by said at least one terminal.

9. A method according to claim 6, wherein said step of sending the verified and digitally signed accounting information to the AAA-server comprises:

sending the digitally signed accounting information from said at least one terminal to said at least one EAP service authorization server by means of said EAP-response, verifying the signature of the digitally signed accounting information at the at least one EAP service authorization server, and sending the digitally signed accounting information from said at least one EAP service authorization server to the AAA server.

10. A method according to claim 1, wherein the digitally signing is performed by means of a public key algorithm.

11. A system for transferring accounting information, said system comprising:

a metering server for metering data related to a service, an Extensible Authentication Protocol (EAP) service authorization server including a generator for generating Extensible Authentication Protocol requests (EAP-request) for service authorizations, and a network connection means, a terminal including a signer arranged to digitally sign verified accounting information, an Extensible Authentication Protocol response (EAP-response) generator arranged to insert digitally signed accounting information in EAP-responses, and a network connection means, and an Authentication Authorization Accounting (AAA) server arranged to manage accounting information relating to at least one terminal.

12. A system according to claim 11, wherein the metering server and the EAP service authorization server are arranged in the same device.

13. A system according to claim 11, wherein the metering server and the EAP service authorization server are arranged in different devices.

14. A system according to claim 11, further comprising an access point, wherein the access point includes said metering server.

15. A system according to claim 14, wherein said at least one terminal is a Wireless Local Area Network (WLAN) enabled terminal and said at least one access point is a WLAN access point.

16. A system according to claim 11, wherein said generator for generating Extensible Authentication Protocol request (EAP-request) service authorizations is arranged to insert accounting information of at least one terminal in EAP-requests for service authorizations.

17. A system according to claim 11, wherein said terminal further comprises a verifier arranged to verify accounting information received from a service authorization server.

18. A system according to claim 11, wherein said EAP service authorization server further comprises a signature verifier for verifying signatures of terminals, and an accounting message generator for generating accounting messages to be sent to said AAA-server.

19. A method in a terminal, said method comprising:

collecting data corresponding to accounting information relevant for at least one service presently utilized in the terminal, receiving an Extensible Authentication Protocol request (EAP-request) for service authorization, digitally signing accounting information, and sending the digitally signed accounting information in an Extensible Authentication Protocol response (EAP-response).

20. A method according to claim 19, wherein the accounting information that is digitally signed in the step of digitally signing accounting information is the data collected in the step of collecting data corresponding to accounting information.

21. A method according to claim 19, wherein said EAP-request for service authorization, received in the step of receiving an EAP-request for service authorization, includes accounting information relevant for said at least one service presently utilized in the terminal.

22. A method according to claim 21, the method further comprising:
comparing said received accounting information with the collected data, and
if the collected data corresponds with the accounting information then performing said steps of digitally signing accounting information and sending the digitally signed accounting information.

23. A method according to claim 19, wherein receiving an EAP-request and sending an EAP-response is performed over a Wireless Local Area Network connection.

24. A method according to claim 19, wherein the act of digitally signing comprises encrypting said verified accounting information by means of a public key cryptosystem.

25. A terminal comprising:
a collector arranged to collect data corresponding to accounting information relevant for at least one service presently utilized in the terminal,
a signer arranged to digitally sign accounting information,
an Extensible Authentication Protocol response (EAP-response) generator arranged to insert digitally signed accounting information in EAP-responses, and
a network connection means.

26. A terminal according to claim 25, further comprising a comparing device arranged to compare the collected data with received accounting information.

27. A terminal according to claim 25, wherein said network connection means is a Wireless Local Area Network (WLAN) connection means for connecting said terminal to a WLAN.

28. A terminal according to claim 25, further comprising a public key cryptosystem encryption algorithm for signing verified accounting information.

29. A method in an Extensible Authentication Protocol (EAP) service authorization server, said method comprising:
receiving accounting information related to at least one terminal,
sending, to at least one terminal, an Extensible Authentication Protocol request (EAP-request) for ordering service authorization,
receiving an Extensible Authentication Protocol response (EAP-response) including signed accounting information, which has been signed in the at least one terminal, and
providing an Authentication Authorization Accounting server with the signed accounting information.

30. A method according to claim 29, wherein said accounting information is received via a network.

31. A method according to claim 29, wherein said accounting information is received via internal communication means of a device in which said EAP service authorization server is included.

32. A method according to claim 29, further comprising:
inserting said received accounting information in the EAP-request, before the acts of sending an EAP-request and receiving an EAP-response is performed, for ordering service authorization.

33. A method according to claim 29, wherein the signature of said signed accounting information is verified by means of a public key cryptosystem algorithm.

34. A method according to claim 29, further comprising verifying the signed accounting information before the signed accounting information is provided to said AAA server.

35. A method according to claim 29, wherein said EAP-response is received from a terminal via a Wireless Local Area Network (WLAN).

36. An Extensible Authentication Protocol (EAP) service authorization server comprising:
an accounting information receiver for receiving accounting information relating to at least one terminal,
an Extensible Authentication Protocol request (EAP-request) generator arranged to generate EAP-requests for service authorizations,
an extractor for extracting digitally signed accounting information from an Extensible Authentication Protocol response (EAP-response) received,
an accounting message generator for generating a message, complying with an Authentication Authorization Accounting (AAA) protocol, including said digitally signed accounting information, and
a network connection means.

37. An EAP service authorization server according to claim 36, wherein said EAP service authorization server is comprised in an access point.

38. An EAP service authorization server according to claim 36, wherein the EAP-request generator further is arranged to insert accounting information relating to services used by at least one terminal in an EAP-request.

39. An EAP service authorization server according to claim 36, further comprising at least one public key for decryption of a signed message.

40. A computer program directly loadable into the internal memory of a terminal, the computer program comprising software code portions for performing the method of claim 19.

41. A computer program directly loadable into the internal memory of an Extensible Authentication Protocol (EAP) service authorization server, the computer program comprising software code portions for performing the method of claim 29.

42. An Extensible Authentication Protocol response (EAP-response) packet comprising digitally signed accounting information relating to a terminal.

43. An EAP-response packet according to claim 42, wherein the packet includes a Data type field specifying the signing method used for signing the accounting information, and a Data field including the signed accounting information, which is signed by means of the method specified in the Data type field.

44. A method according to claim 7, wherein said step of sending the verified and digitally signed accounting information to the AAA-server comprises:
sending the digitally signed accounting information from said at least one terminal to said at least one EAP service authorization server by means of said EAP-response,
verifying the signature of the digitally signed accounting information at the at least one EAP service authorization server, and
sending the digitally signed accounting information from said at least one EAP service authorization server to the AAA server.

45. A computer program directly loadable into the internal memory of a terminal, the computer program comprising software code portions for performing the method of claim 20.

46. A computer program directly loadable into the internal memory of a terminal, the computer program comprising software code portions for performing the method of claim 21.

47. A computer program directly loadable into the internal memory of a terminal, the computer program comprising software code portions for performing the method of claim 22.

48. A computer program directly loadable into the internal memory of a terminal, the computer program comprising software code portions for performing the method of claim 24.

49. A computer program directly loadable into the internal memory of an Extensible Authentication Protocol (EAP) service authorization server, the computer program comprising software code portions for performing the method of claim 32.

50. A computer program directly loadable into the internal memory of an Extensible Authentication Protocol (EAP) service authorization server, the computer program comprising software code portions for performing the method of claim 33.

51. A computer program directly loadable into the internal memory of an Extensible Authentication Protocol (EAP) service authorization server, the computer program comprising software code portions for performing the method of claim 34.

* * * * *